(No Model.)　　　　　　　　　　　　　　　　6 Sheets—Sheet 2.
J. A. KEYES.
CASH REGISTER AND INDICATOR.
No. 563,182.　　　　　　　　　　　　Patented June 30, 1896.
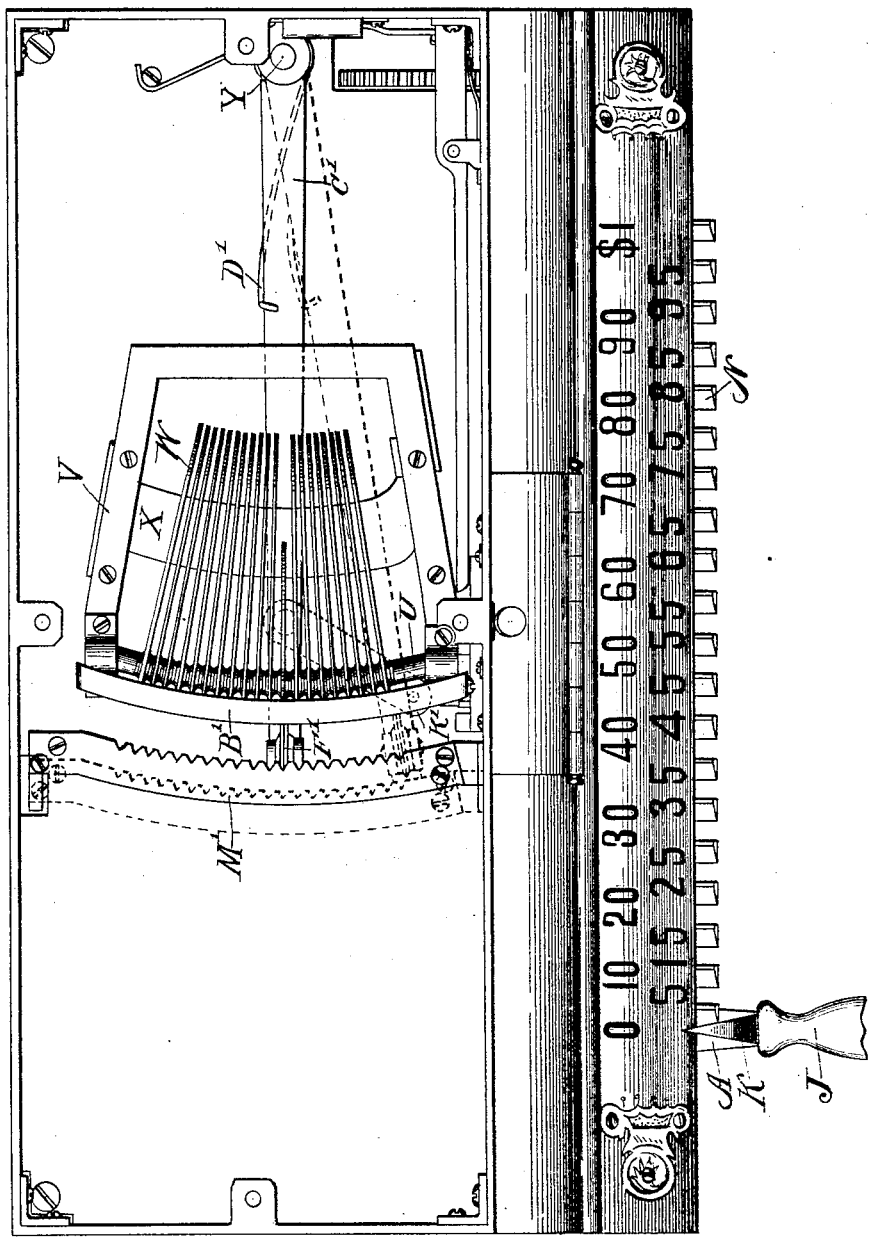
Witnesses,
S. H. Brainard.
R. B. Caffray.
Inventor:
James A. Keyes
by Edward Rector
his atty

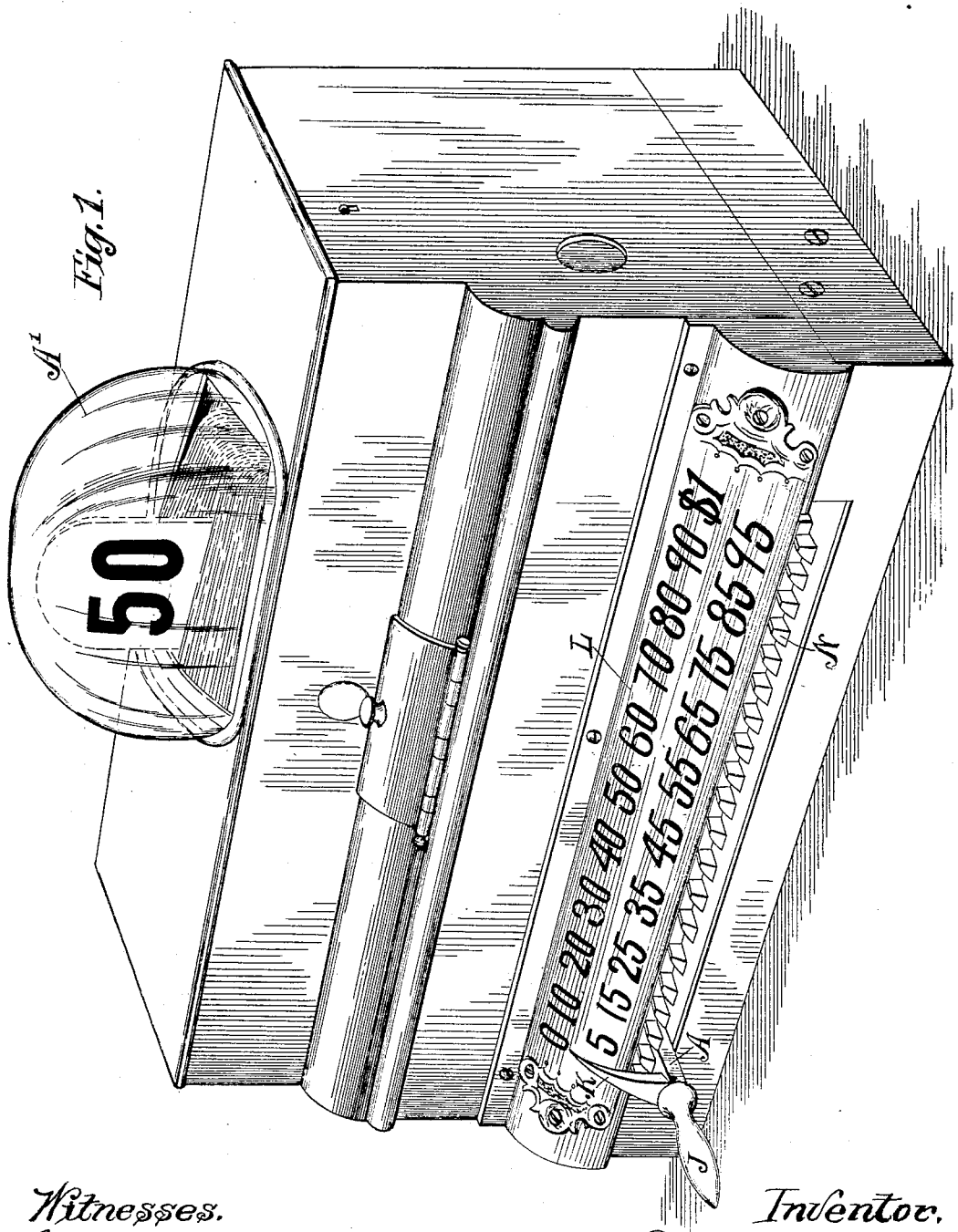

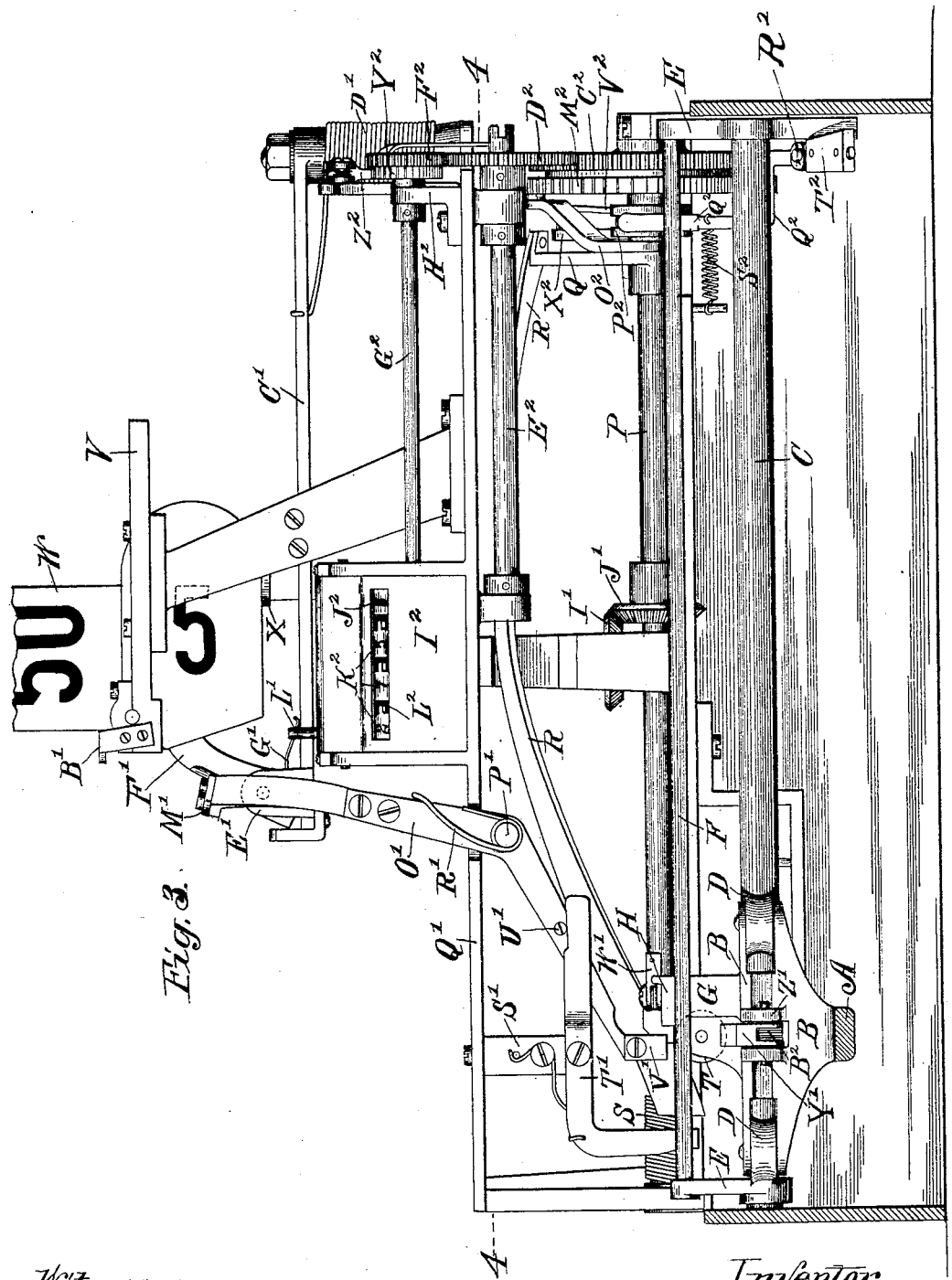

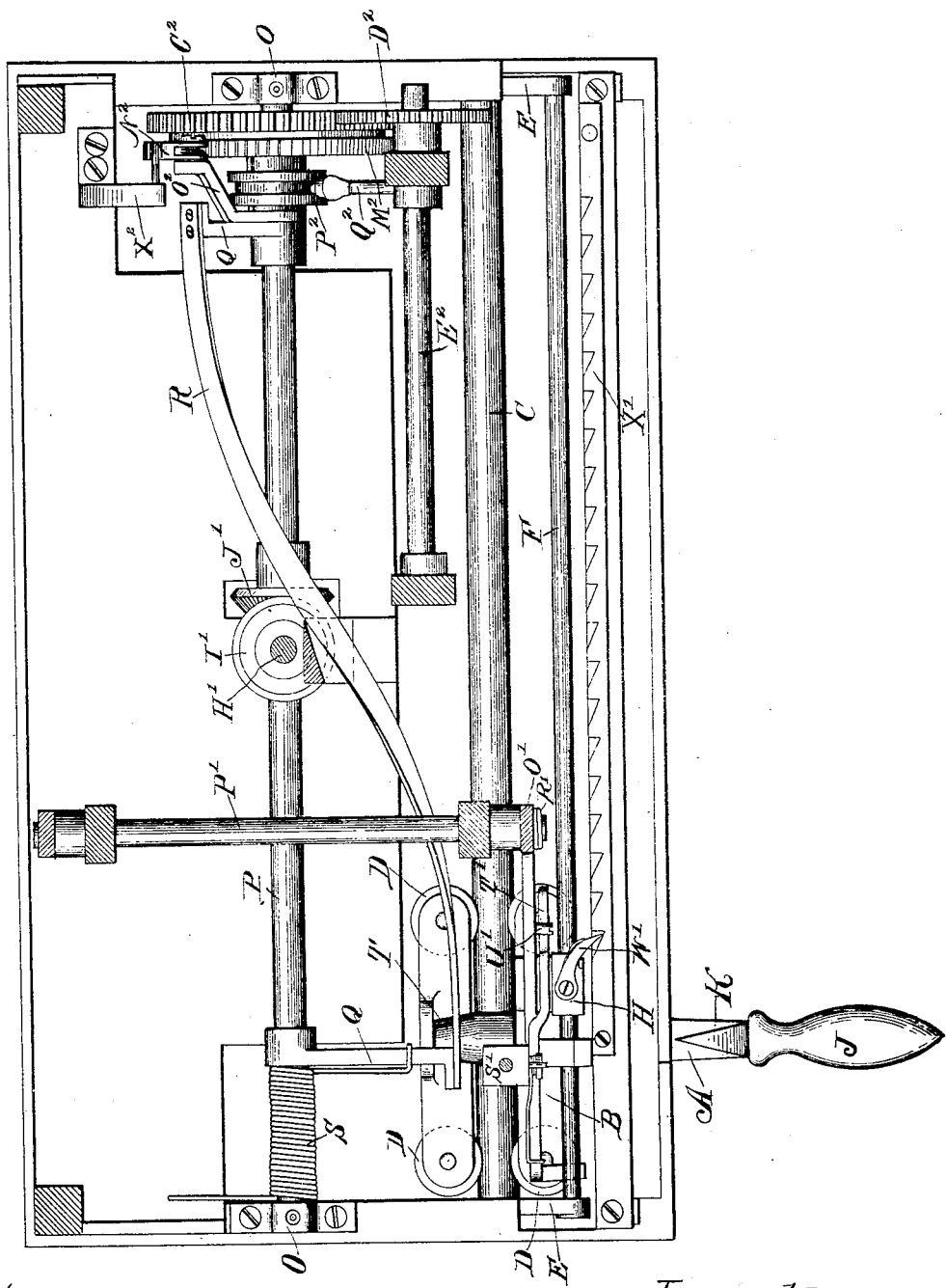

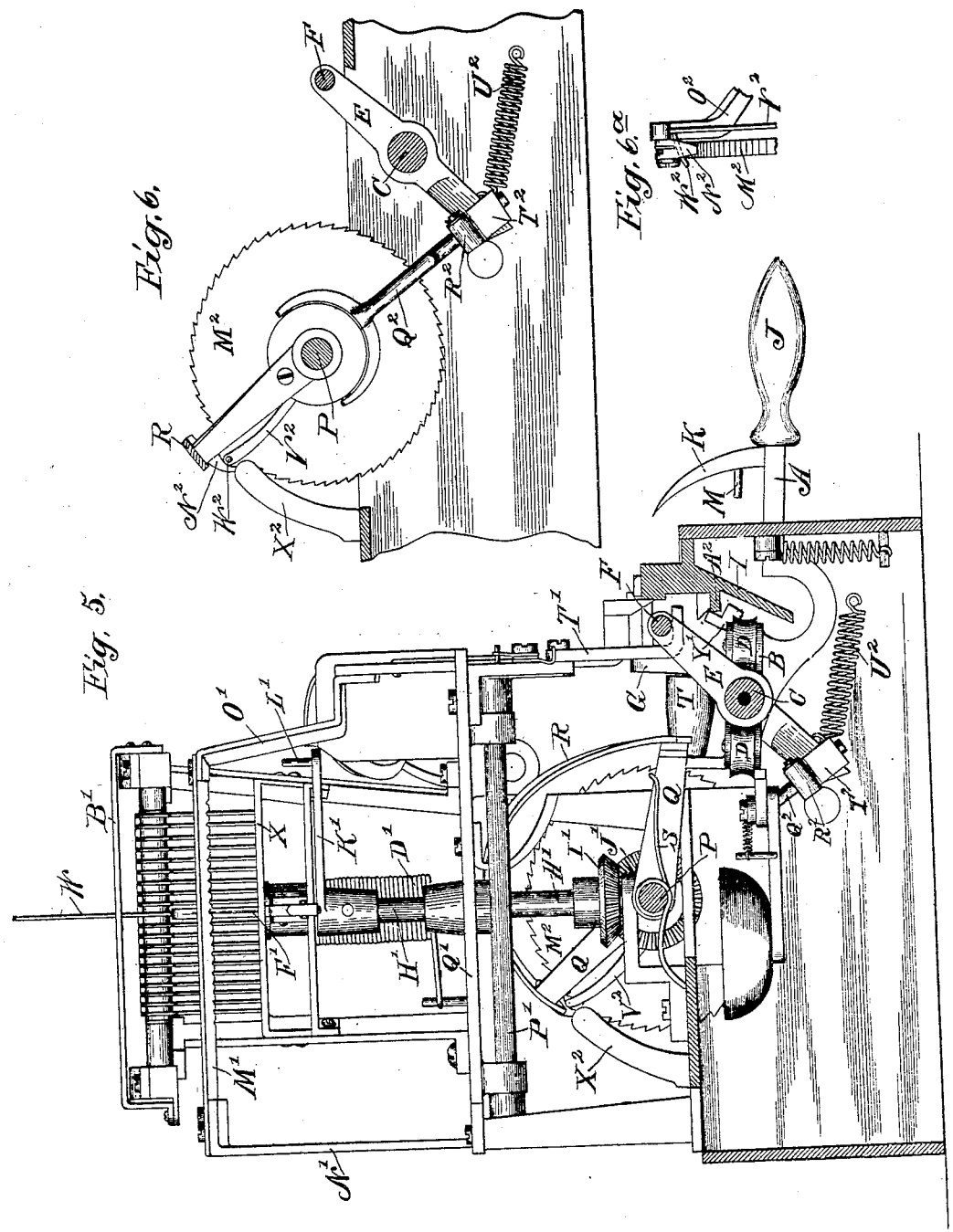

(No Model.) 6 Sheets—Sheet 6.
J. A. KEYES.
CASH REGISTER AND INDICATOR.
No. 563,182. Patented June 30, 1896.
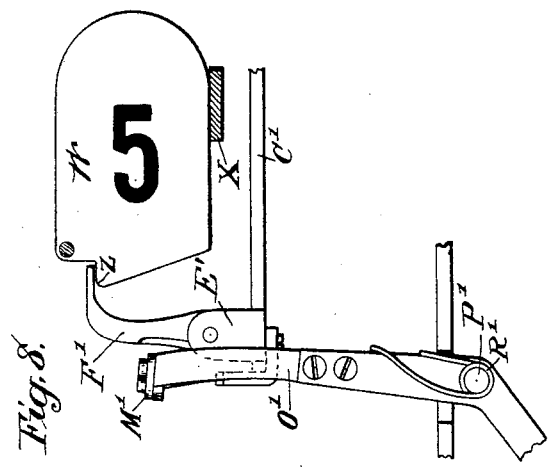
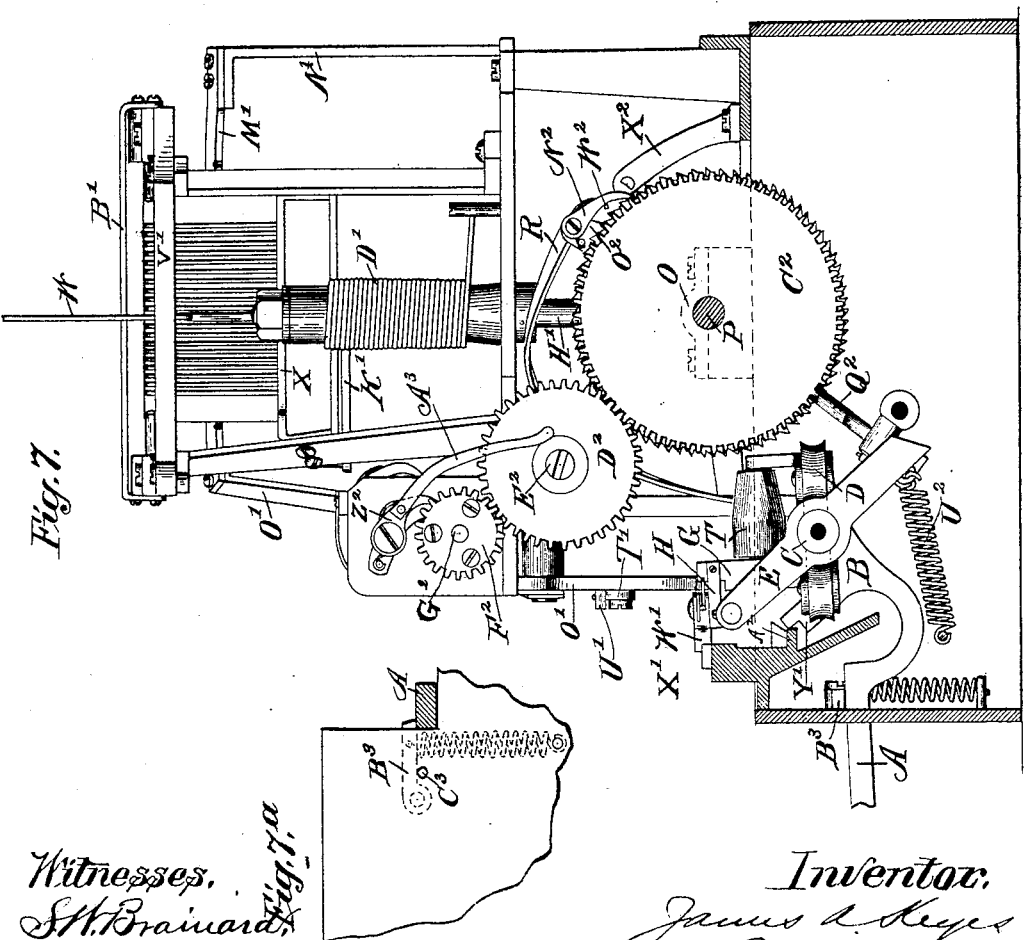
Witnesses.
S. H. Brainard,
R. B. Caffray.
Inventor.
James A. Keyes
by Edward Rector
his atty

UNITED STATES PATENT OFFICE.

JAMES A. KEYES, OF NEW YORK, N. Y., ASSIGNOR TO THE NATIONAL CASH REGISTER COMPANY, OF DAYTON, OHIO.

CASH REGISTER AND INDICATOR.

SPECIFICATION forming part of Letters Patent No. 563,182, dated June 30, 1896.

Application filed October 9, 1893. Serial No. 487,633. (No model.)

*To all whom it may concern:*

Be it known that I, JAMES A. KEYES, a citizen of the United States, residing at New York, in the county and State of New York, have invented a certain new and useful Improvement in Cash Registers and Indicators, of which the following is a description, reference being had to the accompanying drawings, forming part of this specification.

My invention relates to machines of the general character of that shown and described in Letters Patent No. 507,314, dated October 24, 1893, to Leo Ehrlich, of St. Louis, Missouri. The present machine has the same general mode of operation as that shown and described in the aforesaid pending application; and its novelty consists in the different organizations and arrangements of its parts, and in combinations and modes of operation subordinate to those in the prior machine, all as will be hereinafter set forth, and particularly pointed out in the claims.

In the accompanying drawings, Figure 1 is a perspective view of my complete machine inclosed in its casing; Fig. 2, a top plan view of the same with the top plate of the casing removed; Fig. 3, a front elevation of the machine with the upper part of the casing removed and the lower part in section; Fig. 4, a horizontal section approximately on the line 4 4 of Fig. 3; Fig. 5, an end elevation of the left-hand end of the machine with the lower part of the casing and one of the supporting-shafts in section; Fig. 6, a detail view of the ratchet-wheel and associated devices at the right-hand end of the machine; Fig. 6$^a$, a detail view showing the registering-pawl and the curved pin for disengaging it from the ratchet; Fig. 7, an end elevation of the right-hand end of the machine with the upper part of the casing removed and the lower part in section; Fig. 7$^a$, a detail view of the locking device for the operating-handle, and Fig. 8 an elevation of the indicators and their actuating devices in different position from that shown in the other figures.

The same letters of reference are used to indicate identical parts in all the figures.

In the present machine, as in the former one, all of the operations are effected by a single handle or lever, and, as in the prior machine, this handle is moved in one direction to set the indicating and registering devices, and in the opposite direction to actuate them to expose the indication to view and add the amount upon the registering-wheels. This operating-handle consists of a lever A, secured to or formed integral with a frame or carriage B, adapted to reciprocate back and forth along a horizontal guide-rod C, being provided with four antifriction-rollers D, embracing said rod and constituting its bearing thereon. Loosely mounted upon the rod C at its opposite ends are two arms E, whose upper ends are rigidly connected by a horizontal rod F. The frame B is provided in rear of this rod with a vertical extension G, having at its upper end a forwardly-projecting plate or flange H, which overlies the rod F, so that whenever the handle A and frame B are slid laterally along the rod C to a given position and the outer end of the handle is then depressed the rod F and arms E will be rocked forward, for the purpose hereinafter explained.

Just inside the casing of the machine the handle A is provided with a downward curve to accommodate a depending guard-plate I, which is employed to guard the opening in the front of the casing through which the handle has its lateral play and to prevent any instrument being inserted through said opening for the purpose of manipulating the interior mechanism of the machine. At its extreme outer end the handle A is provided with a grasping-knob J, and in rear of said knob is provided with an upwardly-extending curved pointer K, which is adapted to coöperate with a series of numbers upon an index-plate L upon the front of the casing. The pointer K is provided with a rearwardly-projecting stud M, which coöperates with a series of beveled lugs N. When the operating-lever is in its uppermost position, the stud M stands above the horizontal plane of the upper sides of the lugs N, so that the handle is free to be moved laterally, and when the handle is depressed to its lowermost position the stud is carried below the plane of said lugs, so that the handle is then free to be moved laterally in the opposite direction. The position of the lugs is such that the spaces between them stand opposite the respective numbers upon the index-plate, so that the handle can be depressed only when the pointer K stands immediately opposite some one of the numbers. In normal position the operating-handle stands at the extreme left-hand end of its limit of movement, with its outer end depressed, and the operation of the machine consists in lifting the handle to its uppermost position, sliding it to the right until the pointer K is brought opposite the number which it is desired to indicate and register, and then depressing it and sliding it back to the left to normal position, such movement of the handle operating the indicating and registering mechanisms in the manner hereinafter set forth.

Extending transversely through the middle portion of the machine and mounted at its opposite ends in bearings upon the side plates of the casing at O is a horizontal rock-shaft P. Fast upon this shaft near its opposite ends are two arms Q, to which is secured a spirally-curved bar or narrow plate R. (Shown more particularly in Figs. 3 and 4.) This spiral bar constitutes the graduated actuating device by which differential movements are imparted to the indicator and register. A spring S, coiled around the shaft P near its left-hand end and bearing upon the left-hand arm Q, presses said arms Q and the bar R forward and downward, their movement in this direction being limited by the engagement of the left-hand end of the bar R with an antifriction-roller T, mounted in the reciprocating carriage B. When the operating-handle is slid to the left to its limit of movement, the roller T will be carried under the extreme left-hand end of the bar R and lift it and the arms Q to their highest and rearmost position, as shown in the drawings, and this may be considered the normal position of the parts, since it is the position they occupy at the end of each operation of the machine. When the operating-handle is moved to the right, the spring S presses the arms Q and bar R forward and downward, the bar R bearing all the time upon the roller T, and the spiral curve of the bar permitting this downward and forward movement of it as the roller moves to the right. The adjustment of the parts is such that when the operating-handle has been moved to the right until its pointer stands opposite a given number upon the index-plate the bar R will have been permitted to move the exact distance necessary to set the indicating and registering device for the indication and registration of the number indicated by the pointer.

The indicating mechanism of the machine, excepting the employment of the spiral bar for setting its actuating device, is quite similar to that shown and described in the aforesaid pending application. As seen more particularly in Fig. 2, there are mounted upon a curved rod U in a frame V in the upper part of the machine a series of numbered indicating plates or tablets W. These plates are loosely hung at their upper left-hand corners upon the rod U and in normal position rest upon a cross-bar X of the frame V. They are suitably spaced upon the rod U by their hubs or by interposed washers, and the rod U is curved in the arc of a circle struck from the point Y, so that the indicator-plates W stand radially to said point. The indicator-plates W are in the present instance approximately rectangular in shape, and have their upper left-hand corners cut away below and to the left of their pivotal support to form shoulders Z, as seen in Fig. 8. When the indicators are resting in their lower position upon the cross-plate X, they are hidden from view within the casing, but when they are swung to vertical position they are exposed to view in a glass dome A', secured upon the top plate of the casing above and opening therein, Fig. 1. When the indicators are swung to vertical position, their movement toward the left is limited by a curved bar B', supported upon the frame V, the indicators resting against this bar while in exposed position. Pivoted upon a suitable support at the point Y, Fig. 2, is an arm C', which extends beneath the indicator-frame V and whose left-hand end projects to the left of said frame and is adapted to be swung backward and forward in the arc of a circle parallel with and slightly to the left of the vertical plane of the curved supporting-rod U of the indicators. A spring D', coiled around the support of the arm C' and bearing against said arm, presses the latter forward and tends to hold it in its extreme forward position. Pivoted between ears E' upon the upper side of the arm C' at its left-hand end, Figs. 2, 3, 5, and 8, is an arm F', yieldingly held in normal vertical position, Fig. 8, by a spring G', but adapted to be swung to the right by means hereinafter described and to have its notched upper end thereby engaged with the shoulder Z of the indicator-plate which it may happen to be standing in line with at the time it is so moved. When the arm F' is swung to the right to its limit of movement, Fig. 3, it will depress the shoulder Z of the corresponding indicator-plate and throw the latter into vertical indicating position.

The means for moving the arm C' to different positions to bring the arm F' opposite the desired indicator, and for then vibrating the arm F' to throw the indicator into vertical position, may now be described as follows: Suitably journaled in the framework at the center of the machine is a vertical rock-shaft H', which has upon its lower end a beveled gear I', which meshes with a second beveled gear J', fast upon the rock-shaft P, which carries the spirally-curved bar R before described. Fast upon the upper end of the rock-shaft H' is an arm K', Figs. 2 and 5, which is provided upon its outer end with an upwardly-projecting pin L', adapted to engage the arm C' before described when the shaft H' is rocked and the arm K' swung toward the rear side of the machine. The adjustment of the parts is such that when the operating-handle is moved to the right until the pointer stands opposite a given number the arm K' will move the arm C' rearward until the arm F' stands immediately opposite the indicator representing the corresponding number. The means for moving the arm F' toward the indicators consists of a swinging bail composed of a notched top bar or plate M' and two side arms N' O', secured at their lower ends to the opposite ends of a rock-shaft P', journaled in bearings upon the under side of the cross-plate Q' of the framework. The right-hand arm O' is extended below and to the left of the rock-shaft P', Fig. 3, forming a lever of said arm. A spring R', coiled around the rock-shaft P' and bearing against the upper end of the arm or lever O', tends to press its upper end to the left and yieldingly hold it in normal position, in which position the upper end of the arm O' will stand substantially vertical, with the notched plate M' disengaged from and at the left of the arm F', Fig. 8. Pivoted to a bracket-plate S' upon the under side of the frame-plate Q' is a bent lever T', Fig. 3, whose right-hand end projects beneath a stud U' upon the forward side of the lower end of the lever O', and whose opposite depending end is bent forward and underlies the rod F, carried by the arms E, mounted upon the rod C and before described, Figs. 3 and 5. It will be remembered that when the operating-handle is depressed the vertical plate G of the reciprocating carriage B, Fig. 3, carries the rod F forward with it, and in this movement the rod F will engage the forwardly-bent lower end of the lever T' and depress it, thereby lifting its opposite end, Fig. 3, and, by engagement of the latter with the stud U' upon the lever O', throwing the upper end of the lever O' and the notched plate M' to the right and engaging said plate with the arm F'. The movement given by this operation is just sufficient to cause the plate M' to engage one of its notches with the arm F' and move the latter far enough to engage its notched upper end with the shoulder Z of the proper indicator, but not to throw the indicator to vertical position. The plate M' is thrown farther to the right at the end of the return stroke of the operating-handle to the left, and the arm F' thereby caused to throw the indicator with which it was engaged into vertical position by the contact of the upper left-hand corner of the plate G with a bearing V' formed upon or secured to the lower end of the arm or lever O', Fig. 3. In this manner at each movement of the operating-handle to the right the arm F' is carried to a point opposite the proper indicator. Upon then depressing the handle the arm F' is engaged with the indicator, and upon then moving the handle to the left to normal position the arm F' is further vibrated to throw the indicator into view.

It will be understood that at the return of the operating-handle to its left-hand normal position the spiral bar R is carried back to normal position against the stress of the spring S and the arm K' returned to its extreme forward position. The engagement of the arm F' with one of the notches in the plate M', as well as the engagement of its notched upper end with the indicator, prevents the arm C' being returned to forward position by its spring D' when the arm K' returns to such position. At the beginning of the next operation of the machine, when the operating-handle is thrown to its upper position, the upper end of the plate G will be thrown rearward and disengaged from the bearing V' upon the lever O', whereupon the spring R' will throw the upper end of the lever O' and the plate M' to the left, and thereby release the arm F', whereupon the spring G' will throw the arm F' to the left to normal position and the spring D' will then throw the arm C' forward against the pin L' upon the setting-arm K', ready to be carried rearward again by the arm K' as the handle is moved to the right.

For the purpose of preventing retrograde movement of the operating-handle toward the right, after it has been depressed and started to the left toward normal position, the forwardly-projecting flange H of the vertical plate G carries a spring-pressed pawl W', which is adapted to coöperate with a notched plate X', secured upon the framework, Fig. 4. When the operating-handle is in its upper position, the upper end of the plate G is thrown rearward and the pawl W' is free from the toothed plate X', so that the handle and parts moving with it may be slid to the right, but when the handle is depressed and the plate G thrown forward the pawl W' is engaged with the notched plate X' and slips over the same during the movement of the handle to the left.

For the purpose of preventing upward movement of the handle, after it has been moved to the right and depressed, until it is moved completely to its normal left-hand position, there is provided a shouldered locking-dog Y', Figs. 3, 5, and 7, which is pivoted between ears Z' upon the reciprocating carriage B and is adapted to coöperate with a locking rib or flange $A^2$ upon the rear side of the plate I heretofore described. A spring $B^2$, Fig. 3, applied to this locking-dog presses it forward, and when the operating-handle is in its upper position the forward side of the dog, below its shoulder, rests against the rib $A^2$. When the handle is moved to the right and depressed, the dog is forced against the rib and yields until its shoulder slips past and catches under the rib, as seen in Figs. 5 and 7. In this position it will be seen that it will prevent any return upward movement of the handle, since if it be attempted to move the handle upward the dog will simply rock slightly upon its pivot and become locked against the rib $A^2$. The rib $A^2$ does not extend quite to the left-hand end of the path of travel of the dog, so that when the handle is moved to its extreme left-hand position the dog clears the rib, and the handle is then free to be thrown upward.

From the foregoing description it will be seen that in its upper position the handle is free to be slid back and forth from left to right, and vice versa, so that if it be accidentally slid too far to the right for the proper number it can be slid back to the left; but that after it has been depressed it is locked both from return upward movement and from any further movement to the right, so the only thing that can be done is to return it completely to normal position and throw into view the indicator for which the actuating devices have been set. During its lateral movement in upper position the operating-handle and parts moved by it are disconnected from the registering devices, so that the latter are not affected by the movement of the handle in such position, but as soon as the handle is depressed it is thrown into gear with the register and actuates it during its return movement to the left, and at the end of such movement, after the full amount represented by the number to which the handle has been moved has been added upon the register, the corresponding indicator is thrown into view to exhibit such number to the customer and bystanders.

The registering devices which are connected with the operating-handle by its downward movement and actuated by the return of the handle to normal position may now be described as follows: Loosely mounted upon the right-hand end of the rock-shaft P, just within the end plate of the casing, is a large gear-wheel $C^2$, which meshes with a smaller gear $D^2$, fast upon the end of a rotary shaft $E^2$, journaled in bearings upon the under side of the frame-plate Q', and the gear $D^2$ meshes with a third gear $F^2$, fast upon the right-hand end of a rotary shaft $G^2$, Fig. 3, which shaft is journaled at its right-hand end in a bracket-plate $H^2$ upon the frame-plate Q' and at its left-hand end in the frame of the register $I^2$. The shaft $G^2$ has fast upon it within the casing of the register $I^2$ the primary registering-wheel $J^2$, while loose upon it are a series of secondary wheels $K^2$, the numbers upon the respective wheels being adapted to be exposed singly at a sight-opening $L^2$ in the casing of the register. The transfer devices between the different wheels may be of the usual or any suitable construction and need not be illustrated or described.

Fast upon the left-hand side of the large gear $C^2$ is a ratchet-wheel $M^2$, with which coöperates a spring-pressed pawl $N^2$, carried by an arm $O^2$, fast upon the rock-shaft P beside the right-hand arm Q, which supports the spiral bar R. Under this construction and arrangement of the parts if the operating-handle were slid to the right and the spiral bar R thrown forward and downward by the action of the spring S the pawl-arm $O^2$ would be thrown forward and the pawl $N^2$ carried over the teeth of the ratchet, and then when the operating-handle was slid to the left to normal position and the bar R moved upward and rearward to its normal position the pawl $N^2$ would turn the ratchet the same distance that the pawl had been moved forward. I prefer, however, that the pawl $N^2$ shall not slip forward over the teeth of the ratchet, but shall be entirely free of the ratchet during its forward movement, so that while the operating-handle is in its upper position it may be slid freely back and forth in both directions without actuating the register, for otherwise if the handle should be slid too far to the right a higher amount than that intended would necessarily have to be registered, since the first backward movement of the handle would turn the ratchet-wheel. To this end I provide a shifting device for throwing the pawl out of engagement with the ratchet at the upward movement of the operating-handle and throwing it into engagement with the ratchet at the downward movement of the handle, and this shifting device may now be described as follows:

Splined upon the shaft P between the ratchet $M^2$ and the pawl-arm $O^2$, Fig. 3, is a collar $P^2$, provided with a circumferential groove in which fits the pins upon the forks of a shifting-lever $Q^2$, Fig. 6, pivoted to the side plate of the machine at $R^2$. A coiled spring $S^2$, Fig. 3, connected to the lever $Q^2$ adjacent the collar $P^2$, tends to pull the upper end of the lever and the collar $P^2$ to the left. The lower end of the right-hand arm E which supports the rod F is extended below the rod C, forming a lever, and its lower end is beveled to coöperate with a plate $T^2$, fast upon the lower end of the shifting-lever $Q^2$. When the operating-handle is in its depressed position and the rod F and arm E are thrown forward to the position shown in Figs. 5 and 6, the lower end of the right-hand arm E is carried away from the plate $T^2$ of the shifting-lever and the spring $S^2$ is permitted to throw the upper rear end of the lever to the left and carry the collar $P^2$ with it. When the operating-handle is moved to its upper position, a coiled spring $U^2$, connected to the lower end of the arm E, will pull the latter forward and throw the lower forward end of the shifting-lever to the left, thereby moving its upper rear end to the right and carrying the collar $P^2$ in that direction. The collar $P^2$ has fast upon its right-hand side an arm $V^2$, Figs. 3, 4, 5, and 6, which carries a pin $W^2$, Fig. 7, projecting to the right beneath the pawl $N^2$. The pin $W^2$ is so bent, Fig. 6ª, that when the collar $P^2$ and arm $B^2$ are slid to the right the pin will ride under and lift the pawl $N^2$ out of engagement with the ratchet $M^2$. Now each time the operating-handle is moved to its upper position and the arms E and rod F thrown rearward by the spring $U^2$ the lower beveled end of the right-hand arm E will engage the lower forward end of the shifting-lever $Q^2$ and force it to the left, Fig. 3, thereby throwing its upper rear end to the right and carrying the collar P² in that direction and causing the pin W² to lift the pawl N² out of engagement with the ratchet. Inasmuch as the collar P² and arm B² turn with the rock-shaft P, when the handle is slid to the right and the shaft P turned forward in the manner before explained the pin W² will hold the pawl out of engagement with the ratchet, and when the handle is depressed and the rod F and arms E thrown forward the lower end of the right-hand arm E will be moved away from the lower forward end of the shifting-lever and the spring S², Fig. 3, will immediately pull the upper rear end of said lever and the collar P² to the left and permit the pawl N² to engage the ratchet, so that during the movement of the operating-handle to the left to initial position and the return backward movement of the rock-shaft and parts carried by it the pawl N² will turn the ratchet-wheel with them. The adjustment of the parts is such that upon each movement of the operating-handle to the right and its return movement to the left the ratchet will be turned just far enough to cause the amount represented by such movement to be added upon the register I² through the train of gears C² D² E² and shaft G². At the end of its rearward stroke the pawl N² engages a stop upon the upper end of a fixed arm X², Figs. 4 and 7, by which the pawl is locked against the ratchet-wheel and any overthrow of the latter by its own momentum prevented.

The shaft G², Fig. 3, has fast upon it beside the gear F² a ratchet Y², with which coöperates a spring-pawl Z² to prevent retrograde movement of the parts.

The rotary shaft E², upon which is secured the gear D², is niched or squared at its extreme right-hand end, Fig. 7, to receive a key or wrench, by which the shaft may be turned to reset the register to zero. The pawl Z² has secured to it a pendent arm A³, whose lower end rests adjacent the end of the shaft E² and which is adapted to be engaged by the wrench or key applied to the shaft and thrown rearward, to lift the pawl Z² out of engagement with the ratchet Y².

Pivoted upon the inner face of the front side of the casing at the left-hand end of the horizontal slot through which the operating-handle has its play is a locking-dog B³, Figs. 5, 7, and 7ª. This dog is pivoted to the casing at its left-hand end and has connected to it a coiled spring which pulls its right-hand end downward against a stop C³ upon the casing. In this position the right-hand end of the dog is slightly above the horizontal plane of the operating-handle A when the latter is in its lower position, so that when the handle is slid to its extreme left-hand position it will catch under the dog, as seen in Fig. 7ª, and be held from upward movement under the stress of the spring U², connected to the right-hand arm E and before described. When the operating-handle is lifted positively to its upper position at the beginning of an operation of the machine, the dog B³ will yield and permit it to pass, and its spring will then restore it to normal position beneath the handle and prevent return downward movement of the latter until the handle is moved to the right again.

As before stated, the general mode of operation of the present machine is similar to that of the machine described in the prior Ehrlich application, but the construction, arrangements, and combinations of the various parts are different, as well as the specific modes of operation, as will be set forth in my claims. So, too, the means employed for setting the indicator and register, to wit, the horizontally-reciprocating operating-handle in combination with the spirally-curved plate or bar, is believed to be entirely new in the present machine. So far as I am aware I am the first in the art to employ a spirally-curved bar of this character in a cash register, indicator, or printer for the purpose of setting or actuating the registering, indicating, or printing mechanism, and I desire to secure the same, broadly, as my invention, whether employed in a machine such as that shown and described or in differently-organized ones. Again, while the spirally-curved form of the plate is the most convenient one for obtaining the graduated or differential movements desired, yet this feature of my invention is not restricted in its broader scope to a bar or plate so curved, since the same differential movements might be obtained to a greater or less degree by the employment of a plate hung upon the rock-shaft and presenting simply an inclined or curved lower or forward edge to the operating-handle or friction-roller carried by the handle and engaging the plate, and I believe myself to be the first in the art to employ a differentially-movable plate or bar of any sort having an inclined or curved edge presented to a laterally-reciprocating operating-handle or actuating device adapted to continuously engage said inclined or curved edge of the plate during its lateral movements and to thereby move said plate different degrees, according to the lateral movement of the operating-handle or actuating device.

Having thus fully described my invention, I claim—

1. In a machine such as described, the combination, with a primary actuating device operated by a single handle having a lateral reciprocating movement in a horizontal plane, of a differentially-movable plate or bar presenting a curved or inclined edge or contact-surface to such actuating device and adapted to be moved different degrees by the different lateral movements of such device, substantially as described.

2. In a machine such as described, the combination, with a primary actuating device operated by a single handle having a lateral reciprocating movement in a straight line, of a differentially-movable plate or bar presenting a curved or inclined edge or contact-surface to such actuating device and adapted to be moved different degrees by the different lateral movements of such device, substantially as described.

3. In a machine such as described, the combination, with a primary actuating device operated by a single handle reciprocating laterally in a straight line, of a differentially-movable plate or bar hung upon an axis parallel with the line of movement of the actuating device and presenting an inclined or curved edge or contact-surface to such actuating device and adapted to be moved different degrees by the different horizontal movements of such device, substantially as described.

4. In a machine such as described, the combination, with a primary actuating device operated by a single handle having a lateral reciprocating movement in a horizontal plane, of a rock-shaft, and a differentially-movable bar or plate carried by said rock-shaft and presenting an inclined or curved edge or contact-surface to the actuating device and adapted to be moved different degrees by the different horizontal movements of such device, substantially as described.

5. In a machine such as described, the combination, with a primary actuating device operated by a single handle having a lateral reciprocating movement in a horizontal plane, of a differentially-movable plate or bar presenting an inclined or curved edge or contact-surface to said actuating device and adapted to be moved different degrees by the different horizontal movements of such device, and an indicating mechanism actuated by such differentially-movable bar or plate, substantially as described.

6. In a machine such as described, the combination, with a primary actuating device operated by a single handle having a lateral reciprocating movement in a horizontal plane, of a differentially-movable plate or bar presenting an inclined or curved edge or contact-surface to said actuating device and adapted to be moved different degrees by the different horizontal movements of such device, and a registering mechanism actuated by such differentially-movable bar or plate, substantially as described.

7. In a machine such as described, the combination, with a primary actuating device operated by a single handle having a lateral reciprocating movement in a horizontal plane, of a differentially-movable plate or bar presenting an inclined or curved edge or contact-surface to said actuating device and adapted to be moved different degrees by the different horizontal movements of such device, and an indicating and a registering mechanism actuated by such differentially-movable bar or plate, substantially as described.

8. In a machine such as described, the combination, with a primary actuating device operated by a single handle having a lateral reciprocating movement in a horizontal plane, of a spirally-curved plate or bar adapted to be engaged by such actuating device and moved different degrees by the lateral movements of such device, substantially as described.

9. In a machine such as described, the combination, with a primary actuating device operated by a single handle having a lateral reciprocating movement in a straight line, of a spirally-curved plate or bar hung upon an axis parallel with the line of movement of such actuating device and adapted to be moved different degrees by the different lateral movements of such device, substantially as described.

10. In a machine such as described, the combination of a horizontally-reciprocating operating-handle or actuating device carrying an antifriction-roller, of a spirally-curved plate or bar spring-pressed against such roller and movable different degrees by the different horizontal movements of the actuating device, substantially as described.

11. In a machine such as described, the combination of a horizontal guide-rod, a horizontal frame or carriage mounted upon said rod and provided with antifriction-rollers bearing against the same, a handle for reciprocating said frame, a spirally-curved plate or bar hung upon an axis parallel with the guide-rod and spring-pressed against a roller carried by said frame and adapted to be moved different degrees by the different lateral movements of said frame, substantially as described.

12. In a machine such as described, the combination, with a primary actuating device operated by a single handle having a lateral movement in a horizontal plane, of a spirally-curved bar or plate adapted to be moved different degrees by the different lateral movements of such device, and an indicating mechanism actuated by such plate, substantially as described.

13. In a machine such as described, the combination, with a primary actuating device operated by a single handle having a lateral movement in a horizontal plane, of a spirally-curved bar or plate adapted to be moved different degrees by the different lateral movements of such device, and a registering mechanism actuated by such plate, substantially as described.

14. In a machine such as described, the combination, with a primary actuating device operated by a single handle having a lateral movement in a horizontal plane, of a spirally-curved bar or plate adapted to be moved different degrees by the different lateral movements of such device, and an indicating and a registering device actuated by such plate, substantially as described.

15. In a machine such as described, the combination, with a primary actuating device operated by a single handle reciprocating laterally in a horizontal plane and in a straight line, of a rock-shaft, a spirally-curved bar or plate secured to and carried by said rock-shaft and adapted to be moved different degrees by the different lateral movements of the actuating device, and an indicating mechanism geared to the rock-shaft, substantially as described.

16. In a machine such as described, the combination, with a primary actuating device operated by a single handle reciprocating laterally in a straight line, of a rock-shaft, a spirally-curved bar or plate secured to and carried by said rock-shaft and adapted to be moved different degrees by the different lateral movements of the actuating device, and a registering mechanism actuated by the rock-shaft during its movement in one direction, substantially as described.

17. In a machine such as described, the combination, with a horizontally-movable operating-handle or actuating device reciprocating back and forth in a straight line, of a rock-shaft, a spirally-curved bar or plate secured to and carried by said rock-shaft and adapted to be moved different degrees by the different lateral movements of the actuating device, a registering mechanism, a clutch connection between the rock-shaft and such mechanism, and a shifter for the clutch actuated by the operating-handle to intermittently connect the shaft to the register, substantially as described.

18. The combination of a register, a horizontally-reciprocating operating-handle movable back and forth in a straight line but in different planes, and connections between said register and handle by which the handle is caused to actuate the register during its movement in one direction and moved independently of it in the other, substantially as described.

19. The combination of a register, a horizontally-reciprocating operating-handle movable back and forth in a straight line but in different planes, and connections between the handle and register by which the handle is permitted to move independently of the register in one plane, becomes connected to the register during its movement from one plane to the other, and actuates the register during its movement in the second plane, substantially as described.

20. The combination of a toothed register wheel or ratchet, a horizontally-reciprocating operating-handle movable back and forth in a straight line but in different planes, a reciprocating pawl actuated by the movements of the handle and adapted to be engaged with and disengaged from the toothed wheel, and means for engaging the pawl with the wheel at the movement of the handle from one plane to the other at one end of its stroke and for disengaging it from the wheel at the movement of the handle back to the first plane at the opposite end of its stroke, substantially as described.

21. The combination of a register, a horizontally-reciprocating operating-handle movable back and forth in a straight line, means for connecting the handle and register at the end of one stroke of the handle and disconnecting them at the end of its opposite stroke, and a lock for preventing disconnection of them, after they have been connected at one end of the stroke of the handle, until the handle has completed its opposite stroke, substantially as described.

22. The combination of a register, a horizontally-reciprocating operating-handle movable back and forth in a straight line, means for connecting the handle and register at the end of one stroke of the handle and disconnecting them at the end of its opposite stroke, a lock for preventing disconnection of the handle and register during the registering stroke, and means for preventing retrograde movement of the handle during such stroke, substantially as described.

23. The combination of a register, a horizontally-reciprocating operating-handle movable back and forth in a straight line but in different planes and having a registering movement in one plane and a non-registering movement in the other, means for connecting the handle and register at the end of one stroke of the handle and disconnecting them at the end of its opposite stroke, and means for automatically locking the handle in the registering plane, when moved into the same, and compelling its full registering stroke before it can be moved into the non-registering plane, substantially as described.

24. The combination of a horizontally-reciprocating operating-handle movable back and forth in a straight line, of a plurality of indicators representing different amounts and normally resting in non-indicating position, an arm movable with the handle in one direction and independently of it in the other, means for retaining said arm opposite the proper indicator during the return of the handle to initial position, and connections between the handle and arm for causing the latter to throw the indicator into indicating position at the end of the movement of the handle, substantially as described.

25. The combination of a horizontally-reciprocating operating-handle, a differentially-movable plate actuated thereby and movable different degrees by the different horizontal movements of the handle, a series of indicators normally resting in non-indicating position, an actuating-arm movable to different positions to coöperate with the different indicators, connections between the differentially-movable plate and said arm for moving it to different positions at different horizontal movements of the operating-handle, and means actuated by the operating-handle and coöperating with said arm to cause it to throw the indicators into indicating position, substantially as described.

26. The combination of a horizontally-reciprocating operating-handle, a differentially-movable plate actuated thereby and movable different degrees at different horizontal movements of the handle, a series of indicators normally resting in non-indicating position, an actuating-arm movable to different positions to coöperate with different indicators, a setting-arm for moving said actuating-arm, geared to the differentially-movable plate and adapted to move the actuating-arm into position to coöperate with different indicators upon the different horizontal movements of the operating-handle, and means operated by the handle for causing the actuating-arm to throw the indicators into indicating position, substantially as described.

JAMES A. KEYES.

Witnesses:
GEO. N. GRAHAM,
W. H. GRAHAM.